United States Patent
Ji et al.

(10) Patent No.: US 9,106,377 B2
(45) Date of Patent: Aug. 11, 2015

(54) METHOD AND DEVICE FOR SENDING AND RECEIVING A REFERENCE SIGNAL

(71) Applicant: Samsung Electronics Co., Ltd., Gyeonggi-do (KR)

(72) Inventors: Hyoung-Ju Ji, Seoul (KR); Joon-Young Cho, Gyeonggi-do (KR); Jo-Ho Lee, Gyeonggi-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 14/295,215

(22) Filed: Jun. 3, 2014

(65) Prior Publication Data

US 2014/0286263 A1    Sep. 25, 2014

Related U.S. Application Data

(63) Continuation of application No. 13/390,502, filed as application No. PCT/KR2010/005339 on Aug. 13, 2010, now Pat. No. 8,743,788.

(30) Foreign Application Priority Data

Aug. 14, 2009 (KR) ........................ 10-2009-0075193

(51) Int. Cl.
| | | |
|---|---|---|
| H04W 80/04 | (2009.01) | |
| H04W 84/12 | (2009.01) | |
| H04L 5/00 | (2006.01) | |
| H04L 27/26 | (2006.01) | |

(52) U.S. Cl.
CPC .............. *H04L 5/0048* (2013.01); *H04L 5/005* (2013.01); *H04L 5/0032* (2013.01); *H04L 5/0041* (2013.01); *H04L 5/0051* (2013.01); *H04L 27/2613* (2013.01); *H04L 5/0023* (2013.01); *H04L 5/0069* (2013.01)

(58) Field of Classification Search
USPC .................................. 370/328, 334, 337, 347
See application file for complete search history.

(56) References Cited

U.S. PATENT DOCUMENTS

| | | | |
|---|---|---|---|
| 2007/0189240 A1* | 8/2007 | Cho et al. ....................... | 370/337 |
| 2010/0035574 A1* | 2/2010 | Punz ........................... | 455/404.1 |
| 2010/0062783 A1 | 3/2010 | Luo et al. | |
| 2010/0087204 A1* | 4/2010 | Islam et al. ................ | 455/456.1 |
| 2010/0120442 A1* | 5/2010 | Zhuang et al. ................ | 455/450 |
| 2011/0026476 A1* | 2/2011 | Lee et al. ....................... | 370/329 |

(Continued)

OTHER PUBLICATIONS

Extended European Search Report dated Aug. 22, 2014 in connection with European Patent Application No. 10808387; 8 pages.

(Continued)

*Primary Examiner* — Andrew Lee

(57) ABSTRACT

The present invention relates to a method for sending and receiving a reference signal for a backhaul subframe in a wireless communication system in which a relay is present and also to a device therefor, constituted in such a way that common reference signals for a plurality of receiving devices and reference signals dedicated to separate receiving devices are allocated dispersed in a subframe, and the common reference signals and the dedicated reference signals are generated and are sent and received via the subframe. The present invention can improve the channel estimation performance for subframes in a wireless communication system. In this way, communications efficiency in wireless communication systems can be improved.

14 Claims, 15 Drawing Sheets

(56) References Cited

U.S. PATENT DOCUMENTS

| | | | |
|---|---|---|---|
| 2011/0194523 A1* | 8/2011 | Chung et al. | 370/329 |
| 2011/0212738 A1* | 9/2011 | Wan et al. | 455/500 |
| 2011/0235730 A1 | 9/2011 | Noh et al. | |
| 2011/0281607 A1* | 11/2011 | Wu | 455/509 |
| 2012/0014477 A1 | 1/2012 | Ko et al. | |
| 2012/0093061 A1* | 4/2012 | Charbit et al. | 370/315 |
| 2012/0208577 A1 | 8/2012 | Wan et al. | |
| 2012/0250636 A1 | 10/2012 | Wang et al. | |
| 2013/0021932 A1 | 1/2013 | Damnjanovic et al. | |

OTHER PUBLICATIONS

Nortel; "Discussion Paper on the Control Channel and Data Channel Optimization for Relay Link"; 3GPP TSG-RAN WG1 #56bis; R1-091384; Seoul, Korea; Mar. 2009; 9 pages.

ZTE; "Measurement of Access Downlink of Type II Relay": 3GPP TSG-RAN WG1 #57bis; R1-092471; Los Angeles, CA; Jul. 2009; 4 pages.

CMCC; "Considerations on Relay Backhaul and Relay-Specific RS"; 3GPP TSG-RAN WG1 #56bis; R1-091564; Seoul, Korea; Mar. 2009: 3 pages.

International Searching Report and Written Opinion of ISA dated Apr. 25, 2011 in connection with International Patent Application No. PCT/KR2010/005339.

Texas Instruments, "Common Reference Symbol Mapping/ Signaling for 8 Tranmsit Antenna", 3GPP TSG RAN WG1, RI-090591, Feb. 9-13, 2009, 8 pages.

Huawei, "Considerations on R-PDCCH for Type 1 relays", CGPP TSG RAN WG1, R1-092375, Jun. 29-Jul. 3 2009, 4 pages.

LG Electronics, "Consideration on Resource Allocation for Relay Backhaul Link", 3GPP TSG RAN WG1, R1-090790, Feb. 9-13, 2009, 5 pages.

Nokia Simenens Networks, "UE-specific reference symbol multiplexing for LTE-Advanced downlink", 3GPP TSG RAN WG1, R1-091352, Mar. 23-27, 2009, 7 pages.

Chinese Office Action dated Dec. 27, 2013 in connection with Chinese Application No. 2010800464608, 13 pages.

* cited by examiner

METHOD AND DEVICE FOR SENDING AND RECEIVING A REFERENCE SIGNAL

CROSS-REFERENCE TO RELATED APPLICATION(S) AND CLAIM OF PRIORITY

The present application is a continuation of prior U.S. patent application Ser. No. 13/390,502, filed on Feb. 14, 2012, which claims priority under 35 U.S.C. §365 to International Patent Application No. PCT/KR2010/005339 filed Aug. 13, 2010, entitled "METHOD AND DEVICE FOR SENDING AND RECEIVING A REFERENCE SIGNAL". International Patent Application No. PCT/KR2010/005339 claims priority under 35 U.S.C. §365 and/or 35 U.S.C. §119(a) to Korean Patent Application No. 10-2009-0075193 filed Aug. 14, 2009. Each of these documents are incorporated herein by reference into the present disclosure as if fully set forth herein.

BACKGROUND OF THE INVENTION

1. Field of the Invention

The present invention relates to a method and apparatus for configuring Reference Signal (RS) to be transmitted by a relay through wireless backhaul in a Orthogonal Frequency Division Multiplexing (OFDM) system using multiple carriers.

2. Description of the Related Art

OFDM is a transmission technique for transmitting data using multiple carriers, i.e. multicarrier data transmission technique which parallelizes the serial input stream into parallel data streams and modulates the data streams onto the orthogonal multiple carriers, i.e. sub-carrier channels.

The origins of multicarrier modulation scheme started in the late 1950's with the microwave radio for military communication purpose, and OFDM using orthogonal overlapping multiple subcarriers has been developed in 1970's but limited in applying to the real systems due to the difficult of implementing orthogonal modulations between multiple carriers. With the introduction of the idea of using a Discrete Fourier Transform (DFT) for implementation of the generation and reception of OFDM signals, by Weinstein, in 1971, the OFDM technology has developed rapidly. Additionally, the introduction of a guard interval at the start of each symbol and use of cyclic prefix (CP) overcomes the negative effects caused by multipath signals and delay spread.

Owing to such technical advances, the OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). That is, the implementation of OFDM could be accomplished by reducing implementation complexity with the introduction of various digital signal processing technologies such as Fast Fourier Transform (FFT) and Inverse Fast Fourier Transform (IFFT).

OFDM is similar to Frequency Division Multiplexing (FDM) but much more spectrally efficient for achieving high speed data transmission by overlapping multiple subcarriers orthogonally. Due to the spectral efficiency and robustness to the multipath fading, OFDM has been considered as a prominent solution for broadband data communication systems.

Other advantages of OFDM are to control the Inter-symbol Interference (ISI) using the guard interval and reduce the complexity of equalizer in view of hardware as well as spectral efficiency and robustness to the frequency selective fading and multipath fading. OFDM is also robust to the impulse noise so as to be employed in various communication systems.

In wireless communications, high-speed, high-quality data services are generally hindered by the channel environments. In wireless communications, the channel environments suffer from frequent changes not only due to additive white Gaussian noise (AWGN) but also power variation of received signals, caused by a fading phenomenon, shadowing, a Doppler effect brought by movement of a terminal and a frequent change in a velocity of the terminal, interference by other users or multipath signals, etc. Therefore, in order to support high-speed, high-quality data services in wireless communication, there is a need to efficiently overcome the above channel quality degradation factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is called a Resource Element (RE). Since different REs are orthogonal with each other, signals transmitted on different REs can be received without causing interference to each other.

Physical channel is a channel defined on the physical layer for transmitting modulation symbols obtained by modulating one or more coded bit sequences. In an Orthogonal Frequency Division Multiple Access (OFDMA) system, a plurality of physical channel can be transmitted depending on the usage of the information sequence or receiver. The transmitter and receiver determine REs on which a physical channel is transmitted, and this process is called mapping.

SUMMARY OF THE INVENTION

Problem to be Solved

The method and apparatus for configuring backhaul subframe reference signal of a relay according to the present invention aims to reduce scheduling delay of relay control channel and improve control and data channel estimation performance and signal reception efficiency.

Means for Solving the Problem

In order to solve the above problems, a transmission method of a transmission apparatus according to the present invention includes allocating common reference signals for a plurality of reception devices and reception device-specific dedicated reference signals in distributed manner in a subframe; and transmitting the subframe generated with the common reference signals and dedicated reference signals.

In order to solve the above problems, a transmission apparatus according to the present invention includes a controller for allocating common reference signals for a plurality of reception devices and reception device-specific dedicated reference signals in distributed manner in a subframe; a reference signal generator for generating the common reference signals and the dedicated reference signals; and a transmission processor for transmitting the common reference signals and dedicated reference signals in the subframe.

In order to solve the above problems, a reception method of a reception apparatus according to the present invention includes receiving a dedicated reference signal for the reception apparatus in a current subframe; and receiving a control channel signal and a data channel signal by estimating channels in the subframe according to the dedicated reference signals.

In order to solve the above problems, a reception apparatus according to the present invention includes a reference signal receiver for receiving a dedicated reference signal for the reception apparatus in a current subframe; a channel estimator for estimating a channel in the subframe according to the dedicated reference signal; and a channel receiver for receiving control channel signal and data channel signal in the channel.

Advantageous Effects

The reference signal transmission/reception method and apparatus according to the present invention is capable of improving channel estimation performance of subframe in a radio communication system. As a consequence, it is possible to reduce scheduling delay in the transmission apparatus of the radio communication system. Also, it is possible to improve the communication efficiency in the radio communication system.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

In addition, the terms and words used in this description and the appended claims are not to be interpreted in common or lexical meaning but, based on the principle that an inventor can adequately define the meanings of terms to best describe the invention, to be interpreted in the meaning and concept conforming to the technical concept of the present invention.

Although the description is directed to the LTE and LTE-A systems, the present invention can be applied to other types of wireless communication systems in which a base station performs scheduling.

The LTE system is a communication system which uses OFDM in downlink and Single Carrier-Frequency Division Multiple Access (SC-FDMA) in uplink. The LTE-A system is an advanced LTE system supporting wider bandwidth by aggregating two or more LTE component carriers, and relay is applied in the LTE-A system.

Figure 1:
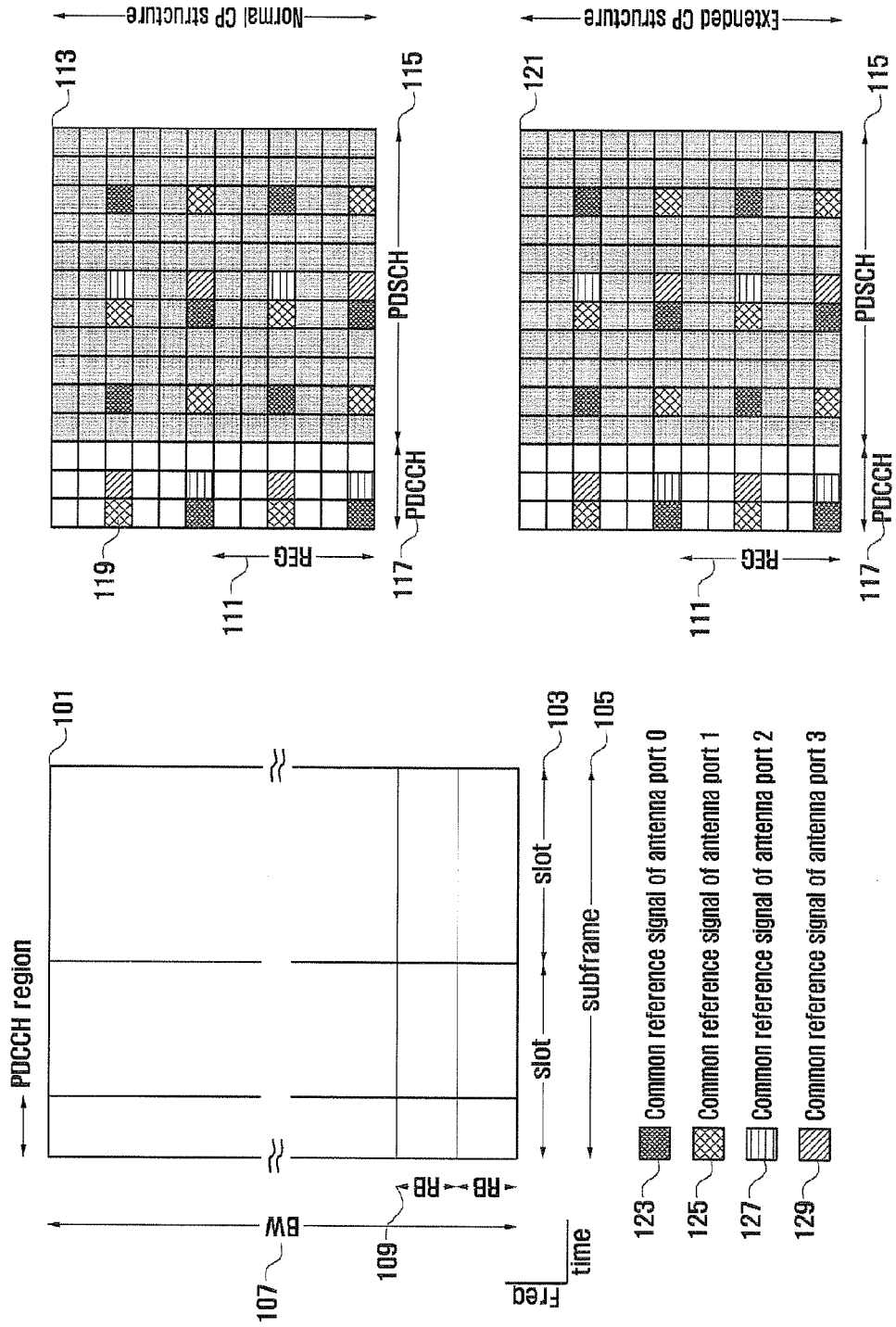
FIG. 1 is a diagram illustrating an OFDM-based downlink frame structure.

FIG. 1 is a diagram illustrating a format of a subframe for use in the LTE system to which the present invention is applied. The subframe can be supported in the LTE-A system with compatibility.

Referring to FIG. 1, a given LTE transmission bandwidth 107 is segmented into a plurality of Resource Blocks (RBs), and each of RBs 109 and 113 is generated from 12 subcarriers in frequency domain and 14 OFDM symbols 113 or 12 OFDM symbols 121 in time domain and is a basic unit of resource allocation. A subframe 105 has duration of 1 ms and consists of two slots 103. The RB consisted of 14 OFDM symbols is transmitted in a normal Cyclic Prefix (CP) subframe structure 113 while the RB consisted of 12 OFDM symbols is transmitted in an extended CP subframe structure 121.

The reference signals (RS) 119, 123, 125, 127, and 129 are the signals agreed for use in channel estimation between a User Equipment (UE) and an evolved Node B (eNB) that are transmitted through corresponding antenna ports, e.g. RS 123 for antenna port 0, RS 125 for antenna port 1, RS 127 for antenna port 2, and RS 129 for antenna port 3. Although the absolute position of an RE designated for RS in the frequency domain varies depending on the cell, the interval between the RSs is maintained. That is, the RSs for the same antenna port are transmitted while maintaining the interval as many as 6 REs, and the reason why the absolute position of the RS varies is to avoid collision between RSs of different cells. The number of RSs can be set differently per antenna port. In more detail, the antenna ports 0 and 1 transmit 8 RSs in one RB or subframe, while the antenna ports 2 and 3 transmit 4 RSs in one RB or subframe. Accordingly, when four antennas are used, the channel estimation using the antenna ports 2 and 3 is inferior to the channel estimation using the antenna ports 0 and 1.

Meanwhile, the control channel region is placed at the beginning of a subframe on the time axis. The control channel region is used to transmit control channel signal. In FIG. 1, reference number 117 denotes the control channel signal region. the control channel signal can be transmitted in up to L OFDM symbols at the beginning of the subframe. L can be 1, 2, or 3. Reference number 117 shows the case where L is 3.

In case that one OFDM symbol is enough for transmitting the control channel, the first OFDM symbol of the subframe is assigned for the control channel (L=1), and the rest 13 OFDM symbols are used for data channel signal transmission. The value L is used as the basic information for demapping at the receiver such that, if L not received, the UE cannot recover the control channel.

In Multimedia Broadcast over a Single Frequency Network (MBSFN), the value of L is fixed to 2 to be used as the channel configured for transmitting broadcast information or can be used for various purposes such as relay backhaul transmission in LTE-A system. If the corresponding subframe is indicated as a broadcast subframe, the LTE UE recognizes the broadcast subframe by referencing the control channel region and stops receiving the data region of the subframe. However, the LTE-A UE can receive the data region for other purpose.

The reason why the control channel signal is arranged at the beginning of the subframe is to allow a UE to check the control channel signal first to determine whether the data channel signal following the control channel signal is destined itself. Accordingly, if it is determined that there is no data channel signal destined to the UE, there is no need for the UE to receive the data channel signal and thus the UE can save the unnecessary power consumption for receiving the data channel signal. Also, since the control channel is received quickly as compared to the data channel, it is possible to reduce scheduling delay.

The LTE standard specifies three downlink control channels: Physical Control Format Indicator Channel (PCFICH), Physical Hybrid ARQ Indicator Channel (PHICH), and Packet Data Control Channel (PDCCH), and these control channels are transmitted in unit of Resource Element Group (REG) 111 in the region denoted by reference number 117 in FIG. 1.

PCFICH is the physical channel for transmitting the Control Channel Format Indicator (CCFI) to UE. OCR is 2-bit information for indicating the number of symbols occupying the control region in a subframe "L". Since a terminal can recognize the number of symbols of the control region based on the CCFI, the PCFICH must be the first channel to be received in a subframe except when the downlink resource is allocated persistently. Since UE does not know the value of L before receiving the PCFICH, the PCFICH is always mapped to the first OFDM symbol of each subframe. The PCFICH is transmitted in 4 resource groups formed by equally separating 16 subcarriers in frequency.

The PHICH is the physical channel for transmitting downlink ACK/NACKs. PHICH is received by the UE which is performing uplink data transmission. Accordingly, the number of PHICHs is in proportion to the number of UEs performing uplink transmissions. PHICH is transmitted in the first OFDM symbol ($L_{PHICH}=1$) or across three OFDM symbols ($L_{PHICH}=3$) of the control region. The PHICH configuration information (number of channel, $L_{PHICH}$) is broadcast through the Primary Broadcast Channel (PBCH) such that all of the UEs acquire the information at their initial connection to the cell. Also, PHICH is transmitted at predetermined position per cell like the PCFICH such that the UEs can acquire the PHICH configuration information by receiving the PBCH when the UE connects to the cell regardless of other control channel information.

PDCCH 117 is a physical channel for transmitting data channel allocation information or power control information. The PDCCH can be transmitted at different channel coding rates according to the channel condition of the target UE. Since Quadrature Phase Shift Keying (QPSK) is fixedly used for PDCCH transmission, it is required to change the resource mount for transmitting PDCCH 117 in order to change channel coding rate. When the channel condition of the terminal is good, a high channel coding rate is used to save the resource. In contrast, when the channel condition of the terminal is bad, a low channel coding rate is used to increase reception probability at the UE even with the cost of large amount of resource. The resource amount consumed by each PDCCH is determined in unit of Control Channel Element (CCE). Each CCE is composed of 5 Resource Element Groups (REG) 111. In order to secure diversity, the REGs of the PDCCH are arranged in the control region after interleaving has been performed.

In order to multiplex several ACK/NACK signals, Code Domain Multiplexing (CDM) technique is applied for PHICH. In a single REG, 8 PHICH signals are multiplexed into 4 real number parts and 4 imaginary number parts by means of the CDM technique and repeated as many as $N_{PHICH}$ so as to be distributed in frequency domain to obtain frequency diversity gain. By using $N_{PHICH}$ REG, it is possible to form the 8 or less PHICH signals. In order to form the PHICH signals more than 8, it is necessary to use other $N_{PHICH}$ REG.

After assigning resources for PCFICH and PHICH, the eNB determines the value of L, maps the physical channels to the REG of the assigned control region 117 based on the value of L. Next, the eNB performs interleaving to obtain frequency diversity gain. The interleaving is performed on the total REGs of the subframe determined by the value of L in unit of REG in the control region. The output of the interleaver in the control region is capable of preventing the Inter-Cell Interference (ICI) caused by using the same interleaver for the cells and obtaining the diversity gain by distributing the REGs of the control region across one or more symbols. Also, it is guaranteed that the REGs forming the same control channel are distributed uniformly across the symbols per control channel.

Recently, research and development is focused on the LTE-A system evolved from the LTE system. In LTE-A, it is taken into consideration to deploy the relays to eliminate shadow areas and to apply wireless backhaul for establishing radio link between the relay and eNB, the relay operating in the same manner as eNB.

Figure 2:
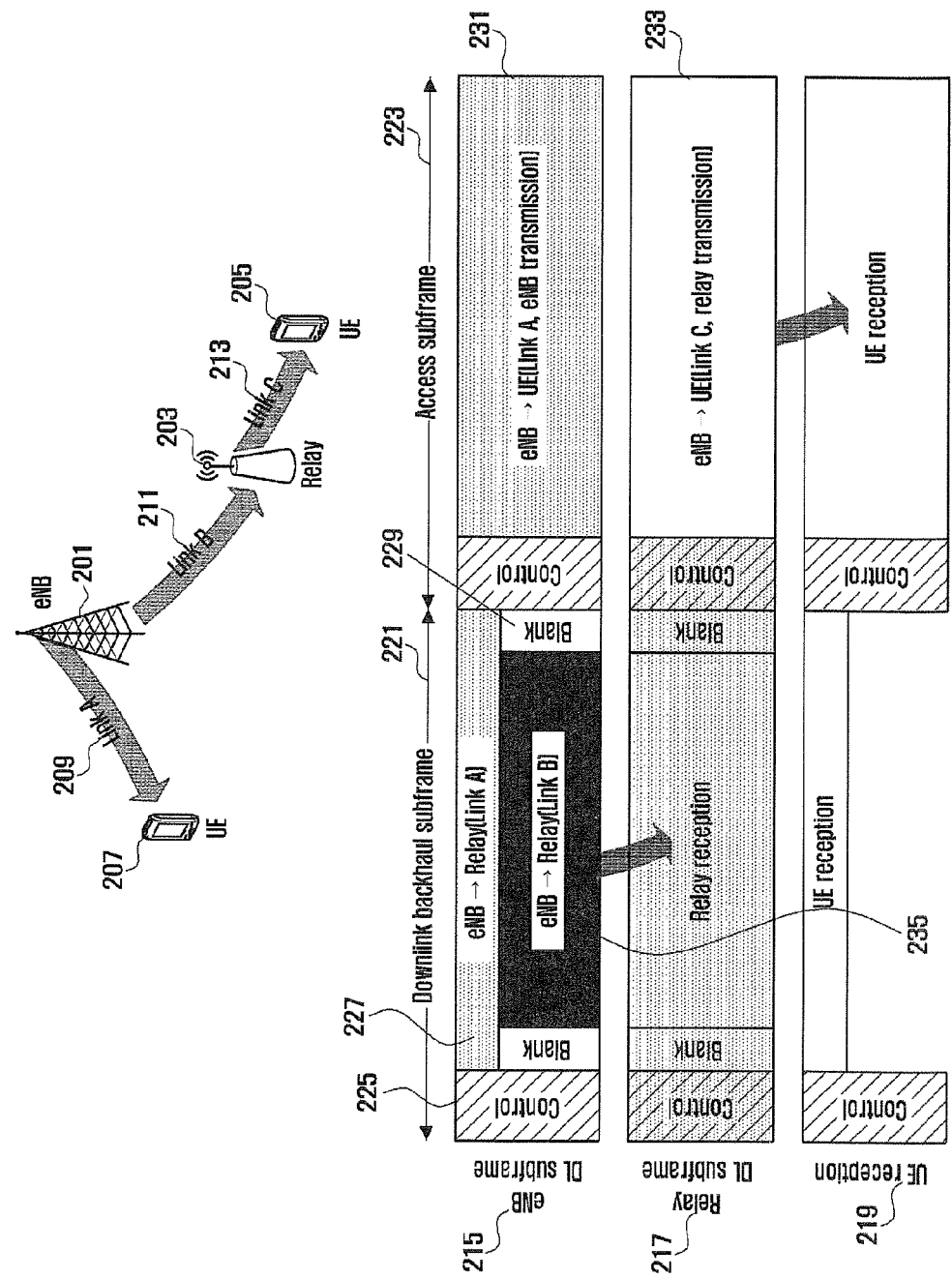
FIG. 2 is a diagram illustrating relationship between transmission and reception frames of a relay in the OFDM system.

FIG. 2 is a diagram illustrating relationship between transmission and reception frames of a relay in the OFDM system.

Referring to FIG. 2, the eNB 201 transmits data to a UE 207 directly and to another UE 205 via a relay 203. The cell having the relay 203 is provided with various links according to the channel properties as shown in FIG. 2.

In FIG. 2, reference number 209 denotes Link A between the eNB 201 and the UE 207, and reference number 213 denotes Link C through which the UE 205 receives signals from the relay 203. In view of the UE 205, however, the relay 203 is recognized as the eNB 201 such that link A 209 and link C 213 can be considered as the same transmission region as denoted by reference number 219. Reference number 211 denotes Link B between the eNB 201 and the relay 203 for use in data transmission to the UE 205 via the relay 203 and higher layer signal exchange between the relay 203 and the eNB 201.

Reference numbers 215 and 217 shows the relationship between the subframe from the eNB 201 to the relay 203 and the subframe from the relay 203 to the UE 205. Reference number 215 denotes the structure of the subframe from the eNB 201 to the UE 207 and the relay 203, and reference number 217 denotes the region for the transmission from the relay 203 to the UE 205 and reception from the eNB 201. Reference number 219 denotes the region in which the UE 207 connected to the eNB 201 and the UE 205 connected to the relay 203 receives signals from the eNB 201 and the relay 203.

Reference number 221 denotes the subframe carrying the data for downlink backhaul transmission. The backhaul subframe can be multiplexed with the transmission to the UE 207 connected to the eNB 201 or transmitted as dedicated backhaul data transmission according to the scheduling. Reference number 235 denotes the resource region used for backhaul transmission. The eNB 201 transmits the control channel 225 in every subframe, and the relay 203 also transmits control channel. Since the relay 203 cannot receive and transmit signal simultaneously, when it is transmitting control channel, the relay 203 cannot receive control channel information transmitted by the eNB 201. The eNB 201 transmits the data to the relay 203 in the region denoted by reference number 235 after control channel transmission such that the relay should receive the data in the corresponding region. Since the relay has transmitted signal in the control channel transmission region, it is necessary to perform transmission/reception switching to receive data in the corresponding region and thus the corresponding region is blank as denoted by reference number 226.

Figure 3:
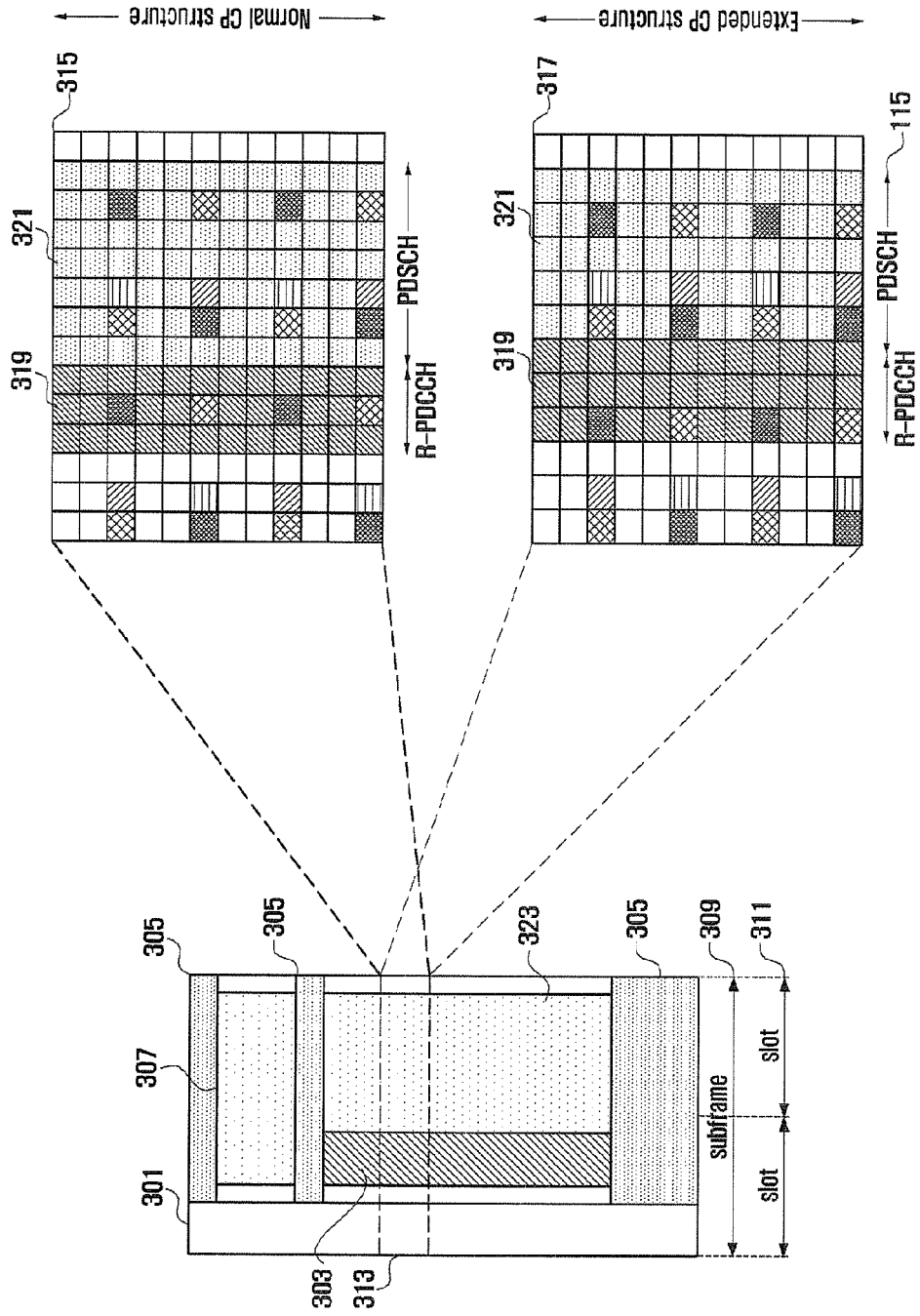
FIG. 3 is a diagram illustrating the structure of a relay backhaul subframe to which the present invention is applied.

FIG. 3 is a diagram illustrating the structure of a backhaul subframe of the relay in the LTE-A system.

Referring to FIG. 3, reference number 301 denotes the control channel region carrying the control channel for scheduling UE in the cell of the eNB. In this region, the relay has to transmit scheduling information for the UE within its own cell so as not to receive signals. Reference number 303 denotes the control channel region transmitted to the relay. This region is notified to the relay in advance through higher layer signaling. Although the eNB notifies the rely of the resource amount for the control channel, the resource carrying the control channel information is a part but not the entire region 303. The region denoted by reference number 303 is entirely for control channel in the drawing. Reference number 323 denotes the data channel region carrying data channel signal transmitted to the relay. The data channel region carrying the data channel signal to the relay can follow the symbols allocated for the control channel region for the relay.

Reference number 305 denotes the data channel region for transmission to the UE within the cell. The eNB scheduler can allocate the data channel region for UE in the middle or edge of the control channel region for the relay according to the control channel region allocated for UE's scheduling information and the relay, and it can be considered to be multiplexed with the relay control channel on frequency resource. Reference number 307 denotes additional data channel region for transmitting data channel signal to the relay. In case that large amount of data is transmitted to the relay and the necessary resource is greater than the frequency resource of the relay control channel region, the eNB can transmit the data channel signal for the relay on the resource other than the previously allocated control channel region.

The structure of the control channel region for the relay is depicted in detail as denoted by reference number 313, and the structures of the normal CP subframe and the extended CP subframe are depicted as denoted by reference numbers 323 and 325 respectively. The control channel region for the relay in the subframe that is represented by reference number 323 and 325 is arranges across three symbols starting from the fourth OFDM symbol and followed by the data channel region starting from seventh symbol. The control channel region for the relay is denoted by reference number 319 and carries the reference signals of ports 0 and 1 while the reference signals of ports 2 and 3 are transmitted in the previous symbol and the next slot's symbols.

As described above, since the relay cannot receive signal in the first three OFDM symbols, when four antennas are used for transmitting the control channel signal for the relay, the relay must use the reference signals of the antenna ports 2 and 3 that are transmitted in the second slot of the subframe for channel estimation of the control channel signal. As described above, the control channel signal is transmitted prior to the data channel signal to reduce the reception delay, however, if the antenna port of the second slot is used, this advantage disappears and only two reference signals exist in the entire subframe and only one RB, resulting in degradation of channel estimation performance.

Figure 4:
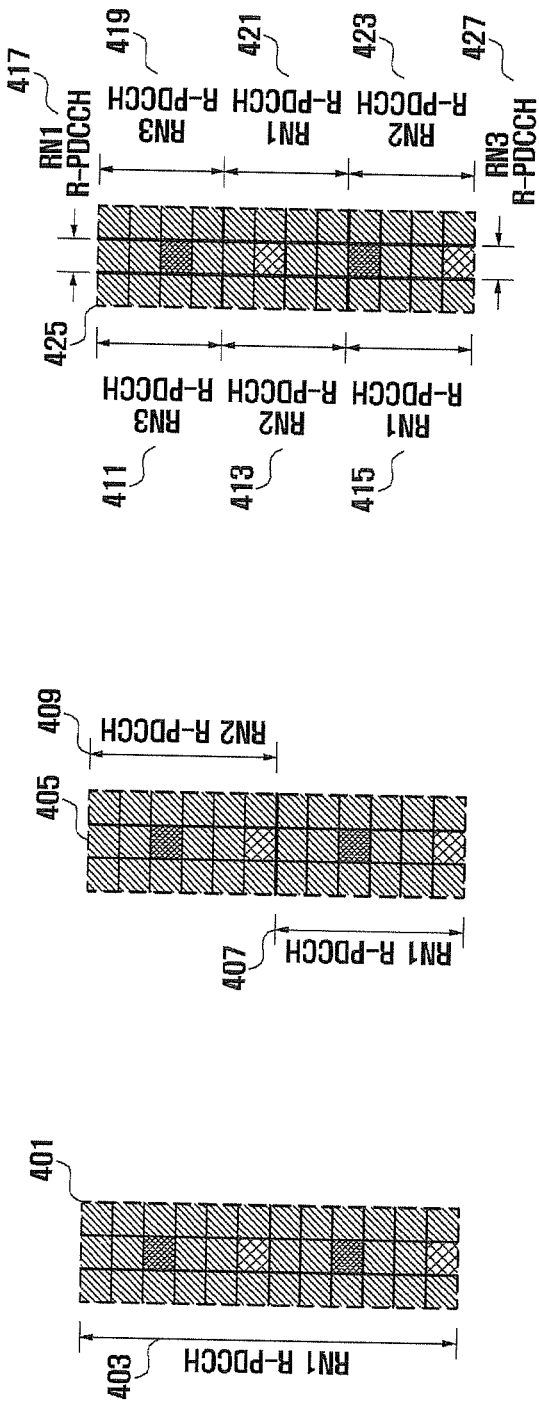
FIG. 4 is a diagram illustrating a structure of the relay control channel according to an embodiment of the present invention.

FIG. 4 is a diagram illustrating a structure of the relay control channel according to an embodiment of the present invention.

Referring to FIG. 4, the control channel region 401 for the relay is mapped to the control channel region allocated one RB as a basic unit for configuring one control channel. Reference number 403 denotes basic unit of resource mapping for one control channel. In case of being configured as denoted by reference number 401, the control channels transmitted to different relays cannot be multiplexed in an RB resource such that the control channel signal for one relay is transmitted on one RB resource. Reference number 405 denotes a case where the control channels for two relays are mapped to one RB. The two resources occupy 6 REs on the frequency axis, and one RB can be used for transmitting the control channels transmitted to up to 2 relays as multiplexed. Reference number 425 denotes the case where four REs is used as the basic unit for one relay control channel configuration. In case that there are control channels transmitted to three relays as denoted by reference number 425, the regions denoted by reference numbers 415, 417, and 421 are partially used for transmitting control channel to the relay 1, the regions denoted by reference numbers 413 and 423 are partially used for transmitting control channel to the relay 2, and the regions denoted by reference number 411, 419, and 427 are partially used for transmitting control channel to the relay 3.

The above described control channel configuration method can be applied to all of the embodiments to be described hereinafter. The embodiments of the present invention proposes configuration for allocating additional reference signals adjacent to the common reference signals along with the common reference signals in the backhaul subframe. Here, the additional reference signal can be generated in the same manner as the common reference signal or in a different manner from the common reference signal. For example, the additional reference signal can be generated according to the correlation among the relays or properties of individual relays. That is, the additional reference signal can be common reference signal, or relay group-specific dedicated reference signal according to the correlations of the relays, or relay-specific dedicated reference signal according to the properties of the relays. In the following description, the conventional reference signal can have the same meaning as common reference signal and indicates the reference signal predetermined in separation with the additional reference signals.

First embodiment

Figure 5:
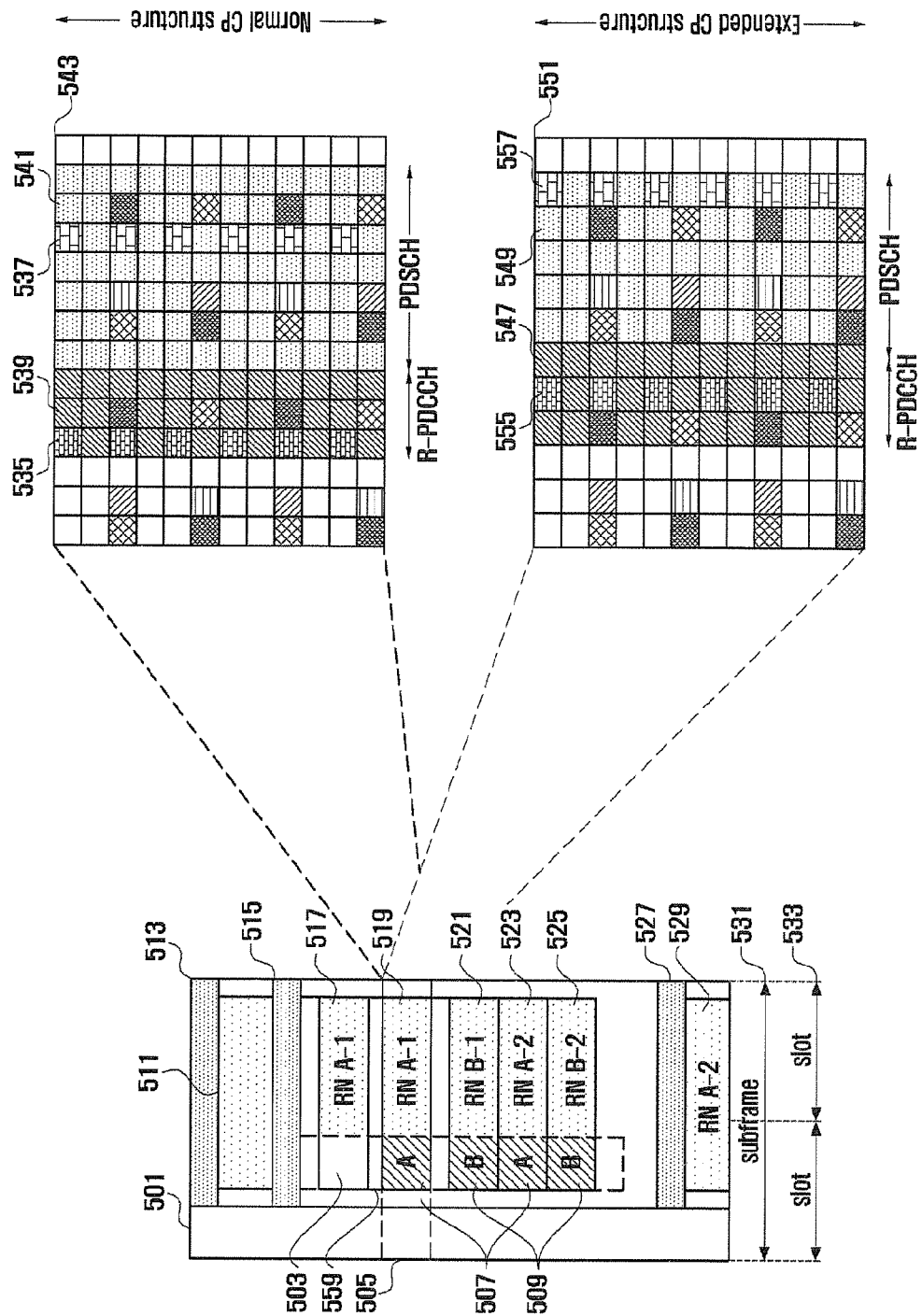
FIG. 5 is a diagram illustrating the structure of a relay backhaul reference signal according to the first embodiment of the present invention.

FIG. 5 is a diagram illustrating the structure of a relay backhaul reference signal according to the first embodiment of the present invention. Referring to FIG. 5, the first embodiment of the present invention proposes a method for grouping the relays having high correlation geographically and spatially in the cell, selecting a precoding to be applied to the group, multiplexing the relay control channels in the group, and transmitting group-specific dedicated reference signal. Meanwhile, since the data channels transmitted to the relays are not multiplexed, relay-specific dedicated reference signals are transmitted. This method is characterized in that the precoding for the control channel and the precoding for the data channel differ from each other.

Referring to FIG. 5, the relays A-1 and A-2 are highly correlated geographically or spatially, and the relays B-1 and B2 are highly correlated geographically or spatially. Accordingly, the eNB categories the relays A-1 and A-2 into a group A and the relays B-1 and B2 into a group B. Since the relay groups have different correlation degrees, the eNB has to form antenna beams with different precodings for the respective groups and thus allocates different resources. Reference number 559 denotes a region available for transmitting entire control channel, reference number 507 denotes the region for transmitting control channel of the relays belonged to group A, and reference number 509 denotes the region for transmitting the control channels of the relays belonged to group B.

For example, the control channels of the relays belonged to the group A are transmitted as multiplexed with the regions 401, 405, and 425 of FIG. 4 in the region 507. The data channels 519, 521, 523, and 525 of the resource regions 507 and 509, with the exception of the control channel region, carriers the data channels of the relays. Accordingly, the data channels of groups A-1 and A-2 are transmitted on the resource used by the relays belonged to the group A as denoted by reference number 507, and since the data channels of the relays are not multiplexed, the regions form the antenna beams with different precodings. Likewise, the data channel regions 521 and 525 corresponding to group B are used for transmitting data channels of the relays B-1 and B02. In case that the data channel to be transmitted to the relays is not enough, additional resource can be used such that, when the RB resource allocated as control channel resource is allocated, the data channel can be transmitted as mapped after the control channel symbol (517) even though no control channel exist in the corresponding resource (559), and the other region (511) is used for transmitting data channel on the entire region (529).

The relay control and data channel structure 505 is described with reference to the normal CP subframe 545 and extended CP subframe 533. In case of the normal CP subframe, the control channels corresponding group A are transmitted in the relay control channel region 539 as multiplexed, and the relay group-specific signals to be transmitted in the control channel 535 are precoded per group so as to be transmitted in the fourth symbol or sixth symbol. In case of the extended CP subframe, the relay control channels of the relays belonged to group A are transmitted as multiplexed in the control channel region 547, and the relay group-specific signals are precoded per relay and transmitted in the third or fourth or sixth symbol of the second slot. In the extended CP frame structure, the data channel of the relay A-1 belonged to group A is transmitted, the relay-specific dedicated reference signals as denoted by reference number 557 are precoded per relay and transmitted in the third or fifth symbol of the second slot.

Figure 6:
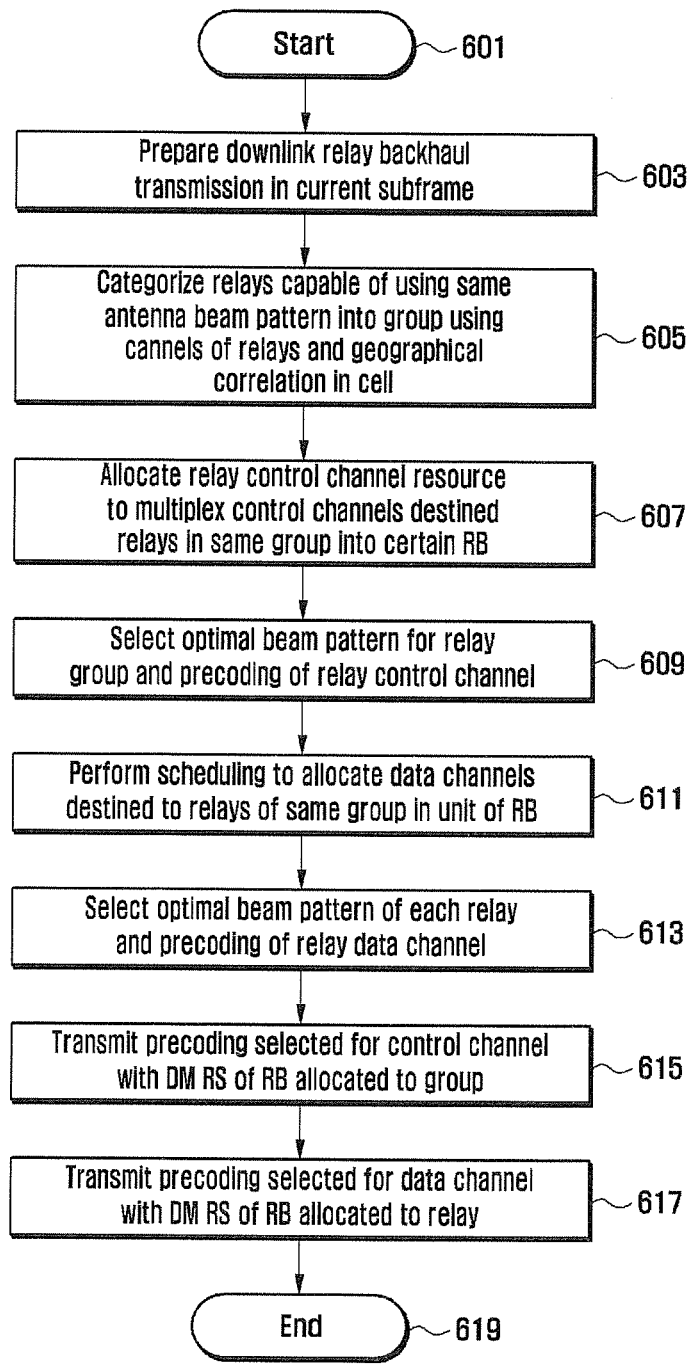
FIG. 6 is a flowchart illustrating the transmission procedure of the eNB according to the first embodiment of the present invention.

FIG. 6 is a flowchart illustrating the transmission procedure of the eNB according to the first embodiment of the present invention.

Referring to FIG. 6, if the current subframe is the subframe for relay back transmission, the eNB prepares downlink backhaul transmission at step 603. Next, the eNB categories the relays that can use the same antenna beam pattern into groups in consideration of the channels and the geographical and spatial correlation in the cell at step 605. The eNB allocates relay control channel resources to multiplex the control channels to be transmitted to the relays belonged to the group into a certain RB resource as predetermined at step 607.

Next, the eNB selects an optimal beam pattern per relay group and performs precoding on the reference signals and control channel in the part where the control channel is transmitted at step 609. At this time, the reference signals include the common reference signals and group-specific dedicated reference signals. Next, the eNB performs scheduling to allocate the data channels destined to the relays in unit of RB at step 611. The eNB selects relay-specific optimal beam pattern for the data channels to the relays to perform precoding on the data channels and reference signals at step 613. At this time, the reference signals include common reference signals and relay-specific dedicated reference signals. Afterward, the eNB transmits the control channel and the relay group-specific dedicated reference signal in the control channel at step 615. Next, the eNB transmits the relay-specific data channels and relay-specific dedicated reference signal at step 617.

Figure 7:
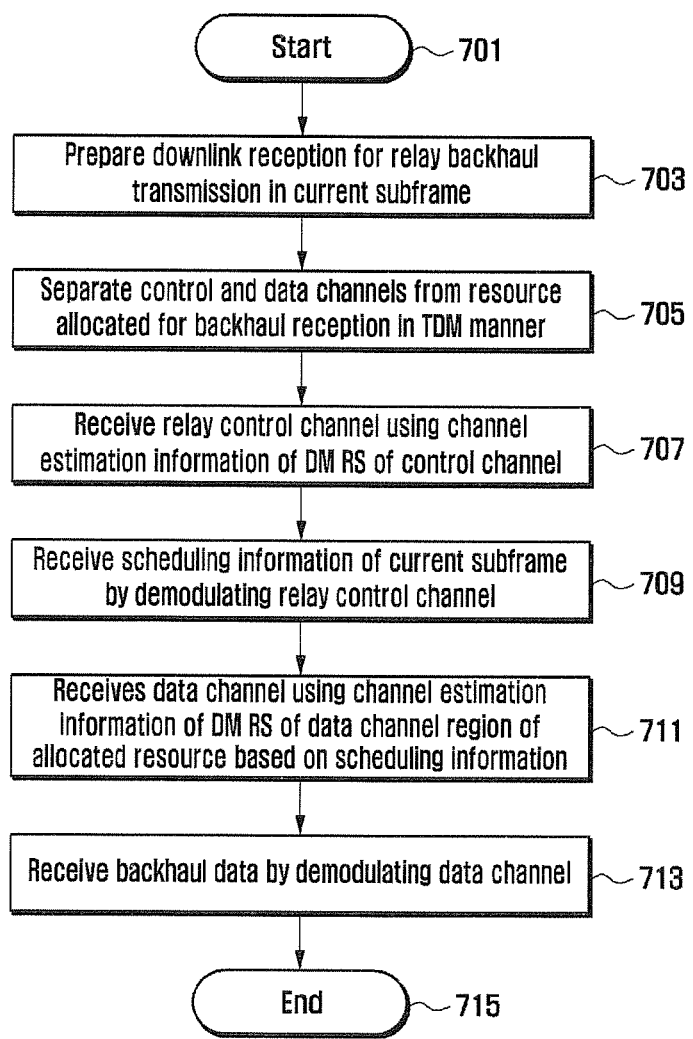
FIG. 7 is a flowchart illustrating a reception procedure of the relay according to the first embodiment of the present invention.

FIG. 7 is a flowchart illustrating a reception procedure of the relay according to the first embodiment of the present invention.

Referring to FIG. 7, if the current subframe is of the relay backhaul, the relay prepares downlink reception at step 703. Next, the relay separates the control and data channel on the allocated resource for backhaul reception at step 705. In case of control channel, the relay receives the relay control channel using the channel estimation value of the reference signal at step 707. At this time, the reference signal includes the common reference signal and relay-specific dedicated reference signal.

Next, the relay demodulates the relay control signal to receive the scheduling information of the current subframe at step 709. Then relay receives the data channel using the channel estimation information of the reference signal in the data channel region of the resource allocated based on the scheduling information at step 711. At this time, the reference signal includes the common reference signal and relay-specific dedicated reference signal. The relay demodulates the data channel to receive the backhaul data at step 713 and ends the procedure.

Second Embodiment

Figure 8:
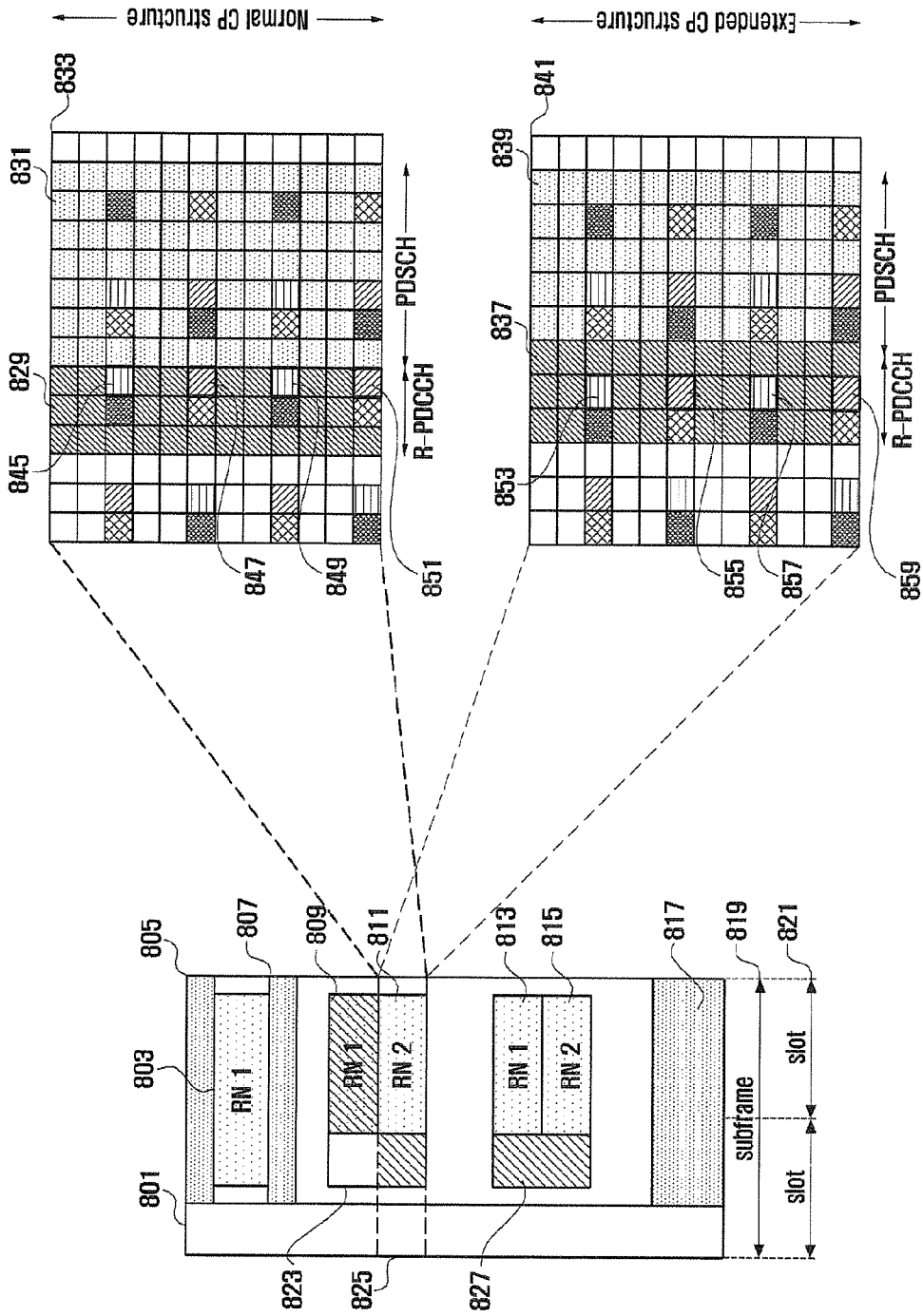
FIG. 8 is a flowchart illustrating a relay control channel multiplexing method proposed in the second embodiment of the present invention.

FIG. 8 is a flowchart illustrating a relay control channel multiplexing method proposed in the second embodiment of the present invention. The control channel resource allocation according to the second embodiment is identical with that of the first embodiment.

Referring to FIG. 8, the method proposed in the second embodiment of the present invention is to transmit the common reference signal (CRS) in the relay control channel region through additional antenna ports. This method is of operating differently according to the number of transmit antennas in such a manner that the legacy subframe and common reference signal are used for the case where the number of antennas is equal to or less than 2 and additional common reference signals for the antenna ports 2 and 3 are transmitted in the relay control channel region for the case where the number of antennas is greater than 2. Since the common reference signal is not transmitted in the entire band in case of the subframe dedicated to LTE-A or MBSFN although it is in the resource region allocated for the relay control channel, all of the common reference signals should be transmitted in the allocated relay control region.

Reference number 823 denotes the region carrying the relay control channel. Although it is possible to multiplex the controls channels destined to multiple relays into one RB or not in the region 823, the non-multiplex structure is more efficient. This is because, when the control and data channels are mapped to different RB resources, it is difficult to perform complementary channel estimation between the reference signals in the first and second slots. In case that the control and data channels are mapped in the same RB, it is possible to perform complementary channel estimation with the reference signals transmitted in all of the slots.

Reference number 809 and 813 denote the regions in which the relay data channel destined to the relay 1 is transmitted, and reference number 811 and 813 are the regions in which the relay data channel destined to the relay 2 is transmitted. Referring to the enlarged drawings 835 and 843 illustrating details of the region 825, reference number 829 denotes the region for transmitting relay control channel, reference numbers 845 and 849 denote the regions for transmitting additional relay common reference signal corresponding to the antenna port 2, and reference numbers 847 and 851 denote the regions for transmitting the additional common reference signal corresponding to the antenna port 3. Reference number 831 denotes the subframe having the same structure as the legacy subframe. Reference number 843 denotes the extended CP subframe structure in which reference number 837 denotes the region carrying the relay control channel, reference number 853 and 857 denote the region carrying the common reference signal corresponding to the antenna port 2, and reference number 855 and 859 denote the region carrying the common reference signal corresponding to the antenna port 3.

In case that the eNB operating in this method forms antenna beam to the relay for transmission, the reference signal is not precoded such that the relay cannot perform demodulation on the data channel region without precoding information. Accordingly, when the data transmitted to the relay are precoded, it is necessary to send the information on the current precoding through higher layer signaling. Since the precoding information of the relay fixed at a position is not changed, it is possible to send the information through higher layer signaling.

Figure 9:
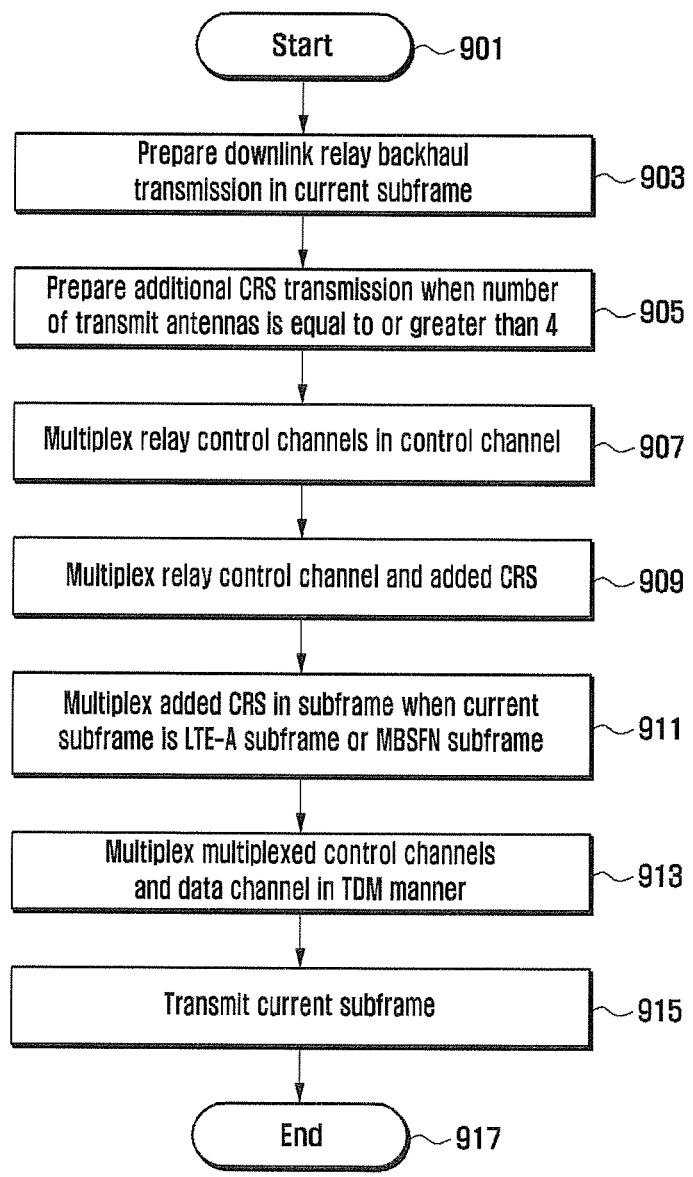
FIG. 9 is a flowchart illustrating the transmission procedure of the eNB according to the second embodiment of the present invention.

FIG. 9 is a flowchart illustrating the transmission procedure of the eNB according to the second embodiment of the present invention.

Referring to FIG. 9, if the current subframe is the subframe is of relay backhaul transmission, the eNB prepares the downlink backhaul transmission at step 903. If the number of transmit antennas of the system is equal to or greater than 4 the eNB prepares additional CRS transmission at step 905. The eNB configures a relay control channel and multiplexes the relay control channel with other control channels at step 907.

Next, the eNB multiplexes the relay control channel with added CRS at step 909. If the current subframe is an LTE-A subframe or MBSFN subframe, the eNB multiplexes the added CRS and the legacy CRS into the relay resource region of the subframe at step 911. The eNB multiplexes the multiplexed control channels and data channels in TDM manner at step 913. The eNB transmits the current subframe at step 915.

Figure 10:
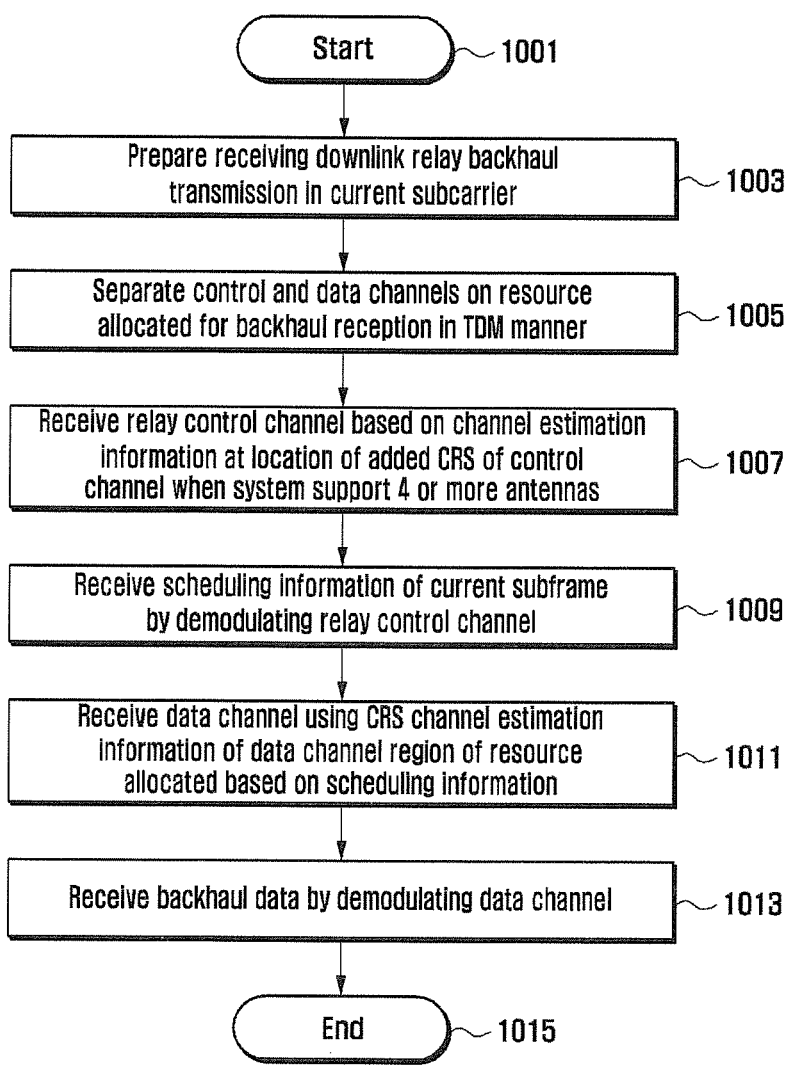
FIG. 10 is a flowchart illustrating the reception procedure of the relay according to the second embodiment of the present invention.

FIG. 10 is a flowchart illustrating the reception procedure of the relay according to the second embodiment of the present invention.

Referring to FIG. 10, if the current subframe is the subframe for relay backhaul, the relay prepares downlink reception at step 1003. The relay separates the control and data channels on the resource allocated for backhaul reception at step 1005. In case that the system supports 4 or more antennas, the relay extracts the channel estimation information at the location for the added CRS to receive the relay control channel at step 1007.

Next, the relay demodulates the relay control channel to receive the scheduling information of the current subframe at step 1009. The relay receives the data channel using the DRS channel estimation information of the resource allocated based on the scheduling information and the added CRS channel estimation information at step 1011. The relay demodulates the data channel to receive the backhaul data at step 1103 and terminates the reception procedure.

Third Embodiment

Figure 11:
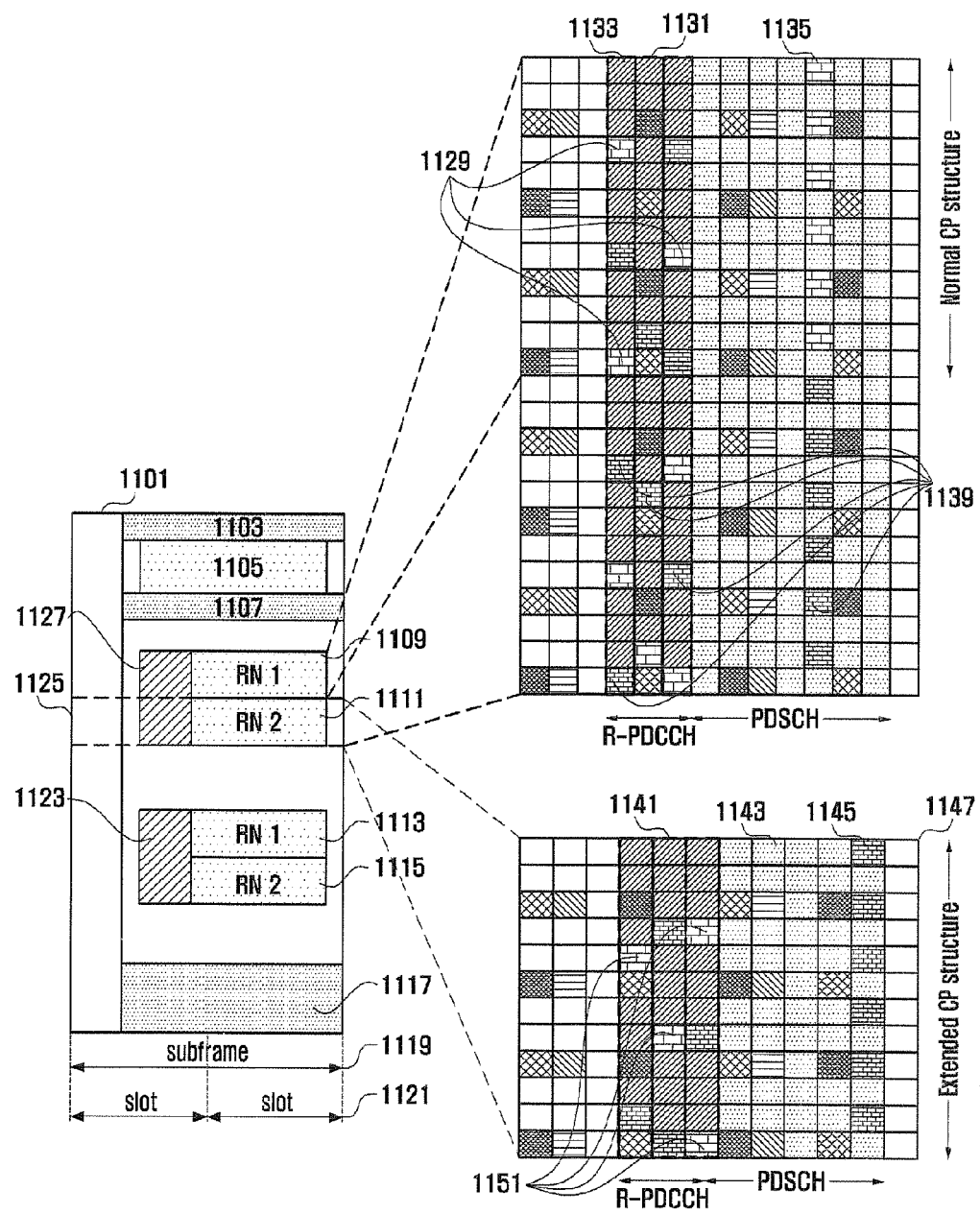
FIG. 11 is a diagram illustrating a relay reference signal configuration method proposed in the third embodiment of the present invention.

FIG. 11 is a diagram illustrating a relay reference signal configuration method proposed in the third embodiment of the present invention.

The method proposed in the third embodiment is of using the relay-specific dedicated reference signal that can be applied to both the control and data channels. This method takes the influence of the multiplexed resource locations arranged randomly when a plurality of relay control channels are multiplexed in the same RB as denoted by reference number 425 of FIG. 4. Although possible to transmit signals in a dedicated pattern when the locations of the resource are fixed, it is difficult to guarantee the channel estimation performance with one pattern when the resource location varies. This embodiment proposes a method for configuring dedicated reference signal that is capable of performing channel estimation even when the resource allocation region varies. In order to accomplish the purpose, it is necessary to reserve a part of the allocated resource for dedicated reference signal so as to spread the dedicated reference signals are dispersed randomly according to the resource arranged randomly.

Referring to FIG. 11, the reference number 1127 denotes the region carrying the control channel of the relay. In case that two relays exist, the control channels transmitted to the two relays are transmitted in the region 1127 as divided in resource allocation unit, and the data destined to the relay 1 are transmitted in the regions 1109 and 1113 of the data channel region and the data destined to the relay 2 in the regions 1111 and 1115.

Referring to parts 1137 and 1149 illustrating the region 1125 in detail, reference number 1137 denotes two RB regions for transmission to the relays 1 and 2. Reference number 1131 denotes the control channel transmission region in which the basic allocation resource of the control channel consists of total 4 REs, three for control channel transmission and 1 for relay-specific dedicated reference signal. Accordingly, reference number 1129 denotes the dedicated reference signal for use in channel estimation of the control channel transmitted to the relay 1, and reference number 113 denotes the dedicated reference signal for data channel transmitted to the relay 1. According to the third embodiment, the precodings used for the control and data channels are of both the relay-specific dedicated control channels and thus identical with each other. Reference number 1139 denotes the dedicated reference signal of the control channel transmitted to the relay 2. Referring to the extended CP structure 1149, reference number 1141 denotes the region for relay control channel transmission, reference number 1151 denotes the dedicated reference signal of the control channel transmitted to the relay 1, and reference number 1145 denotes the dedicated reference signal of the data channel transmitted to the relay 2.

Figure 12:
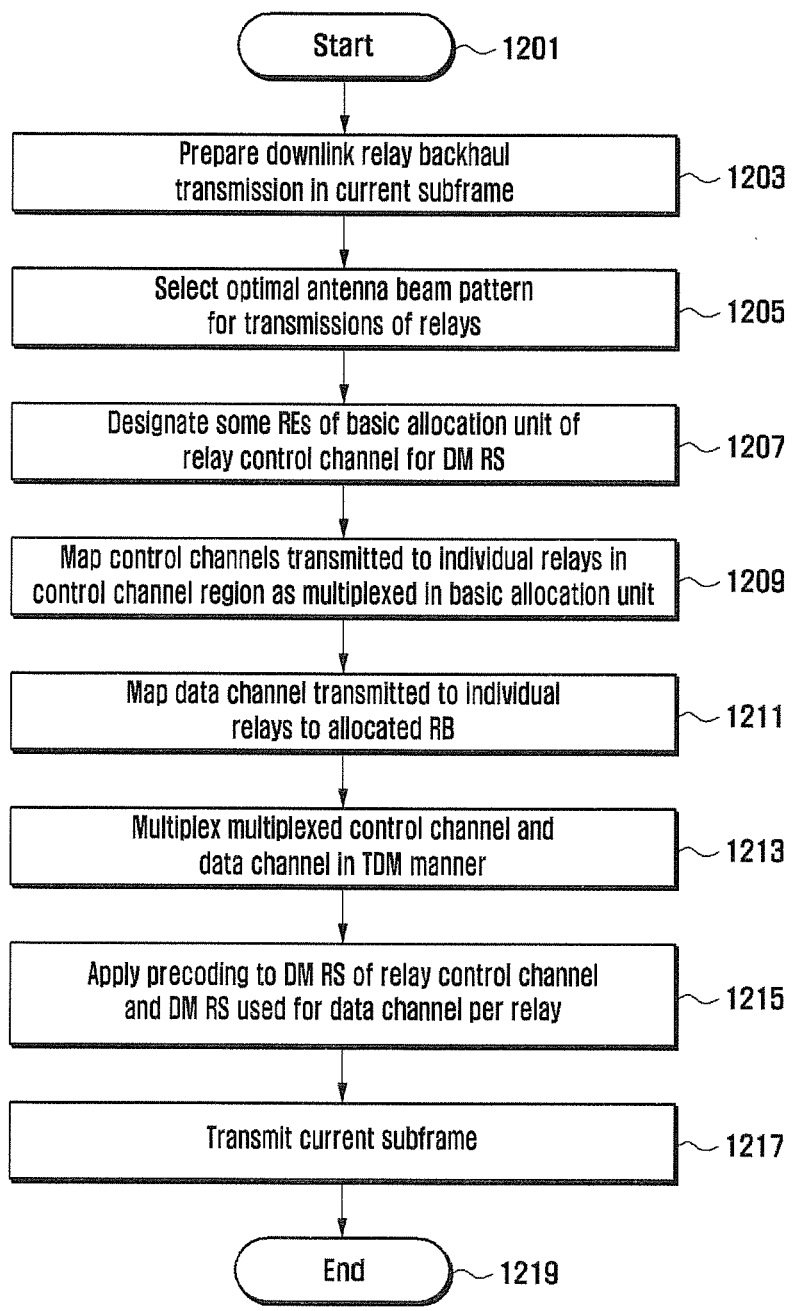
FIG. 12 is a diagram illustrating the transmission procedure of the eNB according to the third embodiment of the present invention.

FIG. 12 is a diagram illustrating the transmission procedure of the eNB according to the third embodiment of the present invention.

Referring to FIG. 12, if the current subframe is of relay backhaul transmission, the eNB prepares downlink backhaul transmission at step 1203. The eNB selects an optimal antenna beam pattern for the channels transmitted to the relays at step 1205. The eNB configures relay control channels and designates some REs in the basic allocation unit of the relay control channel for relay-specific dedicated reference signal at step 1207. Next, the eNB multiplexes the control channels destined to the relays and maps the multiplexed channel to the control channel region at step 1209.

Next, the eNB allocates data channels to the relays and maps the data channels in RB at step 1211. Afterward, the eNB multiplexes the control channels and data channels in TDM manner at step 1213. The eNB applies the precodings selected for the respective relays to the dedicated reference signal used in the relay control channel, the relay control channel, the dedicated reference signal used in the relay data channel, and the relay data channel. The reference signals include the common reference signals and relay-specific dedicated reference signals. The eNB transmits the current backhaul subframe at step 1217 and terminates the procedure.

Figure 13:
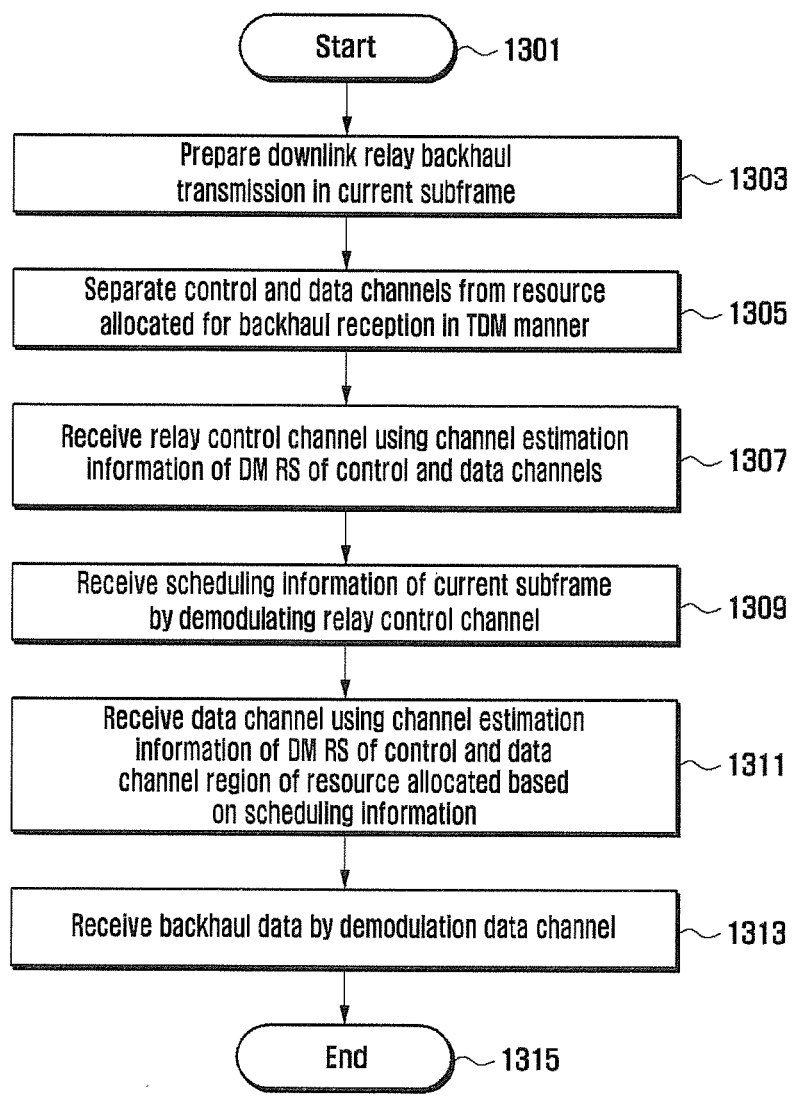
FIG. 13 is a flowchart illustrating the reception procedure of the relay according to the third embodiment of the present invention.

FIG. 13 is a flowchart illustrating the reception procedure of the relay according to the third embodiment of the present invention.

Referring to FIG. 13, if the current subframe is the subframe for relay backhaul, the relay prepares downlink reception at step 1303. Next, the relay separates the control and data channels on the resource allocated for backhaul reception at step 1305. The relay receives the relay control channel using the channel estimation information of the relay-specific dedicated reference signal of the control and data channels at step 1307.

Next, the relay demodulates the relay control channel to receive the scheduling information of the current subframe at step 1309. Next, the relay receives the data channel using the channel estimation information of the relay-specific dedicated reference signal of the control channel region and data channel region of the resource allocated based on the scheduling information at step 1311. The relay demodulates the data channel to receive the backhaul data at step 1313 and terminates the procedure.

A description is made of the internal configurations of the eNB and relay for above-described operations hereinafter.

Figure 14:
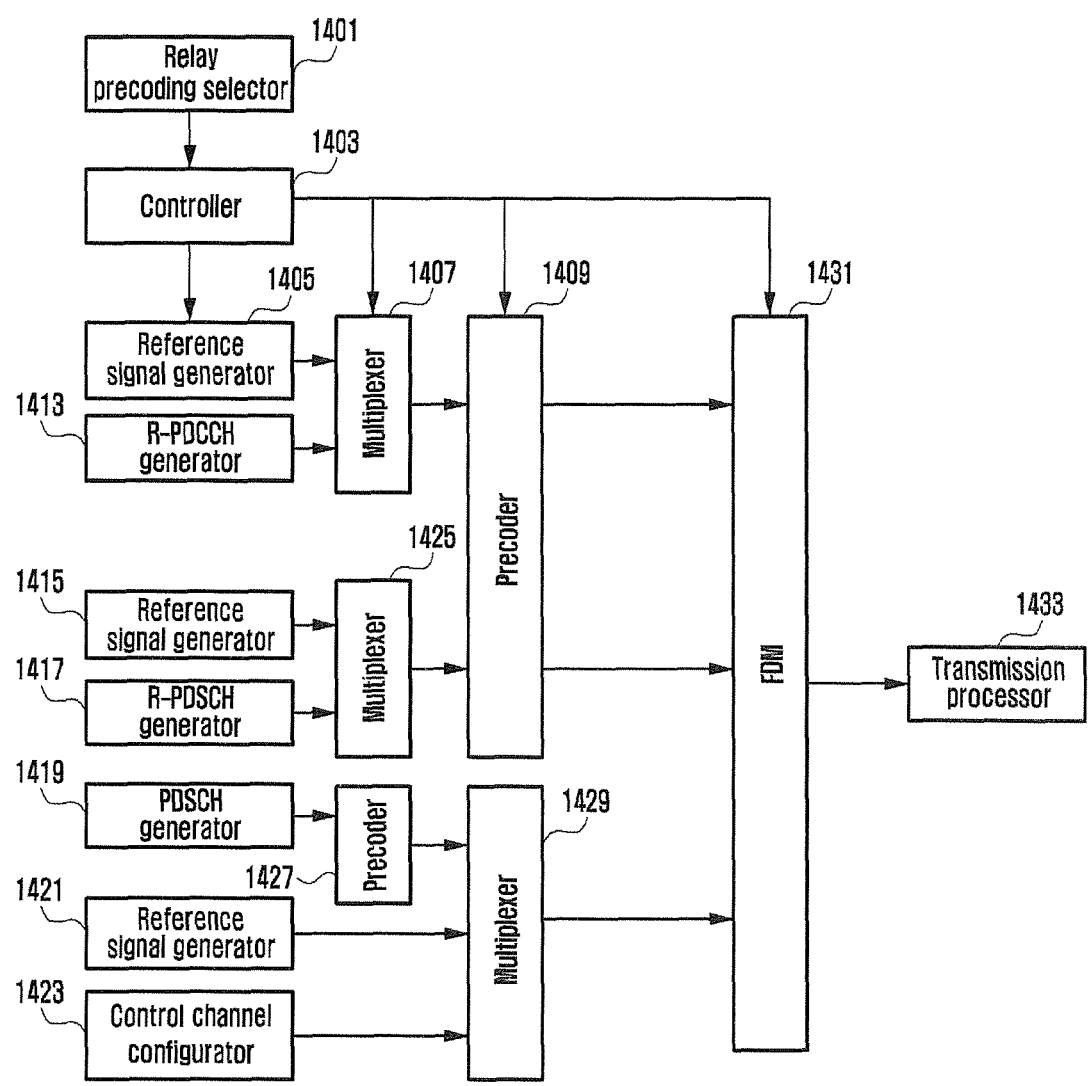
FIG. 14 is a block diagram illustrating a configuration of the eNB according to an embodiment of the present invention.

FIG. 14 is a block diagram illustrating a configuration of the eNB according to an embodiment of the present invention.

Referring to FIG. 14, the eNB includes a relay precoding selector 1401, a controller 1403, a relay control channel reference signal generator 1405, an R-PDCCH generator 1413, a relay control channel multiplexer 1407, a relay data channel reference signal generator 1415, a relay data channel generator 1417, a relay data channel multiplexer 1425, a precoder 1407, a eNB control channel generator 1423, a data channel configurator 1419, a reference signal generator 1421, an FDM 1431, and a transmission processor 1433.

The relay precoding selector 1401 provides the information on the precoding used for the control and data channels of the individual relays. The controller 1403 controls scheduling in the current subframe. The controller 1403 also provides a precoding index using the information output by the relay precoding selector 1401.

The relay control channel reference signal generator 1405 generates reference signals of the relay control channel according to the precoding index. The R-PDCCH generator 1413 generates relay control channels. The relay control channel multiplexer 1407 multiplexes the reference signals and control channel.

The relay data channel reference signal generator 1415 generates reference signals for the relay data channels. The relay data channel generator 1417 generates relay data channels. The relay data channel multiplexer 1425 multiplexes the reference signals and data channels.

The precoder 1407 performs precoding with the selected precoding scheme under the control of the controller 1403. The FDM 1431 multiplexes the signals generated by the control channel configurator 1423, data channel configurator 1419, and reference signal generator 1421, relay control channels, and relay data channels, and then the transmission processor 1433 transmits the subframe.

Figure 15:
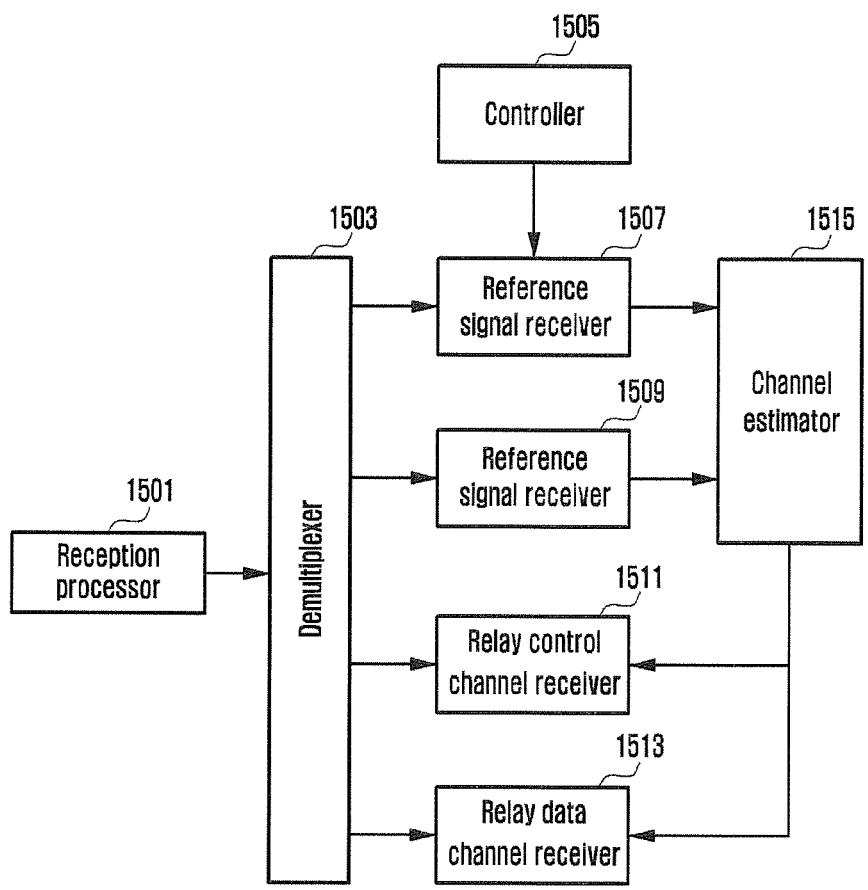
FIG. 15 is a block diagram illustrating a configuration of the relay according to an embodiment of the present invention.

FIG. 15 is a block diagram illustrating a configuration of the relay according to an embodiment of the present invention.

Referring to FIG. 15, the relay includes a demultiplexer 1503, a controller 1505, reference signal receivers 1507 and 1509, a channel estimator 1515, a relay control channel receiver 1511, and a relay data channel receiver 1513.

The demultiplexer 1503 demultiplexes the signal received by the reception processor 1501 into relay control channel and data channel reference signals. The reference signal receivers 1507 and 1509 receive the reference signals under the control of the controller 1505. The channel estimator 1515 notifies of the channel information of the reference signal. At this time, the channel estimator 1515 collects the channel estimation information necessary for the control channel and data channel. The relay control channel receiver 1511 receives the relay control channel using the channel estimation information. The relay data channel receiver 1513 receives the data of the relay data channel using the information demodulated from the control channel.

The reception apparatus of the radio communication system according to the present invention is capable of improving channel estimation performance of subframe. As a consequence, it is possible to reduce scheduling delay in the transmission apparatus of the radio communication system. Also, it is possible to improve the communication efficiency in the radio communication system.

The specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method to transmit control information on a downlink channel by a base station in a wireless communication system, the method comprising:
generating first control information and second control information;
transmitting the first control information on a first control channel based on a common reference signal; and
transmitting the second control information on a second control channel based on a dedicated reference signal, wherein the common reference signal is distributed in a whole bandwidth of the base station, and wherein the dedicated reference signal is allocated in a specific region of the bandwidth of the base station, the specific region being indicated by a higher layer signaling.

2. The method of claim 1, wherein the second control channel corresponds to each reception device, and wherein the second control channel is distributed in a unit of a resource block.

3. The method of claim 1, wherein the common reference signal and the dedicated reference signal are each mapped in a different symbol of a subframe.

4. The method of claim 1, wherein the dedicated reference signal is transmitted after the transmission of the common reference signal.

5. An apparatus of base station to transmit control information on a downlink channel in a wireless communication system, the apparatus comprising:
a transceiver configured to transmit and receive a signal; and
a controller configured to:
generate first control information and second control information,
transmit the first control information on a first control channel based on a common reference signal, and
transmit the second control information on a second control channel based on a dedicated reference signal,
wherein the common reference signal is distributed in a whole bandwidth of the base station, and wherein the dedicated reference signal is allocated in a specific region of the bandwidth of the base station, the specific region being indicated by a high layer signaling.

6. The apparatus of claim 5, wherein the second control channel corresponds to each reception device, and wherein the second control is distributed in a unit of a resource block.

7. The apparatus of claim 5, wherein the common reference signal and the dedicated reference signal are each transmitted in a different symbol.

8. The apparatus of claim 5, wherein the dedicated reference signal is transmitted after the transmission of the common reference signal.

9. A method to receive control information on a downlink channel by a reception device in a wireless communication network, the method comprising:
receiving first control information on a first control channel based on a common reference signal; and
receiving second control information on a second control channel based on a dedicated reference signal after receiving the first control channel in a subframe,
wherein the common reference signal is distributed in a whole bandwidth of the base station, and wherein the dedicated reference signal is allocated in a specific region of the bandwidth of the base station, the specific region being indicated by a higher layer signaling.

10. The method of claim 9, further comprising:
estimating a channel condition based on the dedicated reference signal; and
processing the second control information on the second control channel based on the estimation.

11. The method of claim 9, wherein the common reference signal and the dedicated reference signal are each mapped in a different symbol of a subframe.

12. An apparatus of reception device to receive control information on a downlink channel in a wireless communication network, the apparatus comprising:
a transceiver configured to transmit and receive a signal; and
a controller configured to:
receive first control information on a first control channel based on a common reference signal, and
receive second control information on a second control channel based on a dedicated reference signal after receiving the first control channel in a subframe,
wherein the common reference signal is distributed in a whole bandwidth of the base station, and wherein the dedicated reference signal is allocated in a specific region of the bandwidth of the base station, the specific region being indicated by a high layer signaling.

13. The apparatus of claim 12, wherein the controller is further configured to estimate a channel condition based on the dedicated reference signal and process the second control information on the second control channel based on the estimation.

14. The apparatus of claim 12, wherein the common reference signal and the dedicated reference signal are each mapped in a different symbol of a subframe.

* * * * *